United States Patent
Hidaka et al.

(10) Patent No.: US 9,581,235 B2
(45) Date of Patent: Feb. 28, 2017

(54) HEAT EXCHANGING DEVICE OF LUBRICATION OIL

(71) Applicant: HONDA MOTOR CO., LTD., Tokyo (JP)

(72) Inventors: Yuuichi Hidaka, Wako (JP); Akio Muto, Wako (JP); Masashi Eto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 151 days.

(21) Appl. No.: 14/566,044

(22) Filed: Dec. 10, 2014

(65) Prior Publication Data

US 2015/0176696 A1   Jun. 25, 2015

(30) Foreign Application Priority Data

Dec. 25, 2013 (JP) .................................. 2013-268137

(51) Int. Cl.
*F16H 3/08*     (2006.01)
*F16H 57/04*    (2010.01)
(Continued)

(52) U.S. Cl.
CPC ..... *F16H 57/0417* (2013.01); *F16H 57/0413* (2013.01); *F16H 57/0416* (2013.01);
(Continued)

(58) Field of Classification Search
CPC ....... F16H 59/72; F16H 61/0206; F16H 3/006
(Continued)

(56) References Cited

U.S. PATENT DOCUMENTS 2,670,933 A * 3/1954 Bay .................. F01M 5/007
                                                   165/140
4,628,044 A   12/1986 Loozen
(Continued)

FOREIGN PATENT DOCUMENTS

CN    202431941 U    9/2012
CN    202790493 U    3/2013
(Continued)

OTHER PUBLICATIONS

Office Action dated Nov. 4, 2015, issued in counterpart Japanese Patent Application No. 2013-268137, with English translation. (5 pages).

(Continued)

*Primary Examiner* — Ha D Ho
(74) *Attorney, Agent, or Firm* — Westerman, Hattori, Daniels & Adrian, LLP (57) ABSTRACT

A cooling device for cooling lubrication oil which circulates in a vehicle transmission is provided with a first oil circulating circuit through which a clutch oil for lubricating a first and second clutch of the transmission circulates, a second oil circulating circuit through which a gear oil circulates to lubricate mechanisms other than the first and the second clutches, and a cooling water circulating circuit through which a cooling water circulates to cool an engine and a motor. Also provided is a first heat exchanger exchanging heat between the first lubrication oil and the second lubrication oil, and a second heat exchanger exchanging heat between the first lubrication oil and the cooling water.

11 Claims, 9 Drawing Sheets

(51) Int. Cl.
F28D 1/04 (2006.01)
F28F 27/02 (2006.01)

(52) U.S. Cl.
CPC ................ *F28D 1/04* (2013.01); *F28F 27/02* (2013.01); *Y10T 74/19242* (2015.01)

(58) Field of Classification Search
USPC .................... 74/330, 331, 333; 475/116, 117
See application file for complete search history.

(56) References Cited

U.S. PATENT DOCUMENTS

| | | | | |
|---|---|---|---|---|
| 5,441,099 | A | * | 8/1995 | Yasso ................... G01M 15/102 123/41.31 |
| 5,562,190 | A | * | 10/1996 | McArthur ............. F16D 48/066 192/48.3 |
| 6,244,385 | B1 | * | 6/2001 | Tsubata ............... F16H 57/0412 184/26 |
| 6,740,000 | B2 | | 5/2004 | Wakayama |
| 2002/0128107 | A1 | | 9/2002 | Wakayama |

FOREIGN PATENT DOCUMENTS

| | | |
|---|---|---|
| JP | 60-67498 U | 5/1985 |
| JP | 2002-266993 A | 9/2002 |
| JP | 2003-014090 A | 1/2003 |
| JP | 2005-265014 A | 9/2005 |

OTHER PUBLICATIONS

Office Action dated Oct. 9, 2016, issued in counterpart Chinese Application No. 201410767525.8, with English translation (10 pages).

Search Report dated Oct. 9, 2016, issued in counterpar Chineses Application No. 201410767525.8, with English translation (5 pages).

* cited by examiner

HEAT EXCHANGING DEVICE OF LUBRICATION OIL

CROSS-REFERENCE TO RELATED APPLICATION

This disclosure relates to a subject included in Japanese Patent Application 2013-268137 filed dated on Dec. 25, 2013, and, as a whole, the disclosure therein should be incorporated in this application explicitly by reference.

BACKGROUND

This invention relates to a heat exchanging device of lubrication oil for exchanging heat of lubrication oil which circulates in a transmission of a vehicle.

In conventional arts, some transmissions of a vehicle have gear mechanism and clutch (friction engaging device) for switching an engagement/disengagement power transmission between a driving source and a transmission mechanism disposed in a same chamber (in a same case). In the transmission, the above-described clutch and gear mechanism are lubricated and cooled by the same lubrication oil (ATF: Automatic Transmission Fluid). On the other hand, some transmissions have clutch and gear mechanism respectively disposed in mutually different chambers (in different cases) and different kinds of lubrication oils respectively used for lubricating the clutch and for lubricating and cooling the gear (Japanese Unexamined Patent Application Publication No. 2003-14090). In these transmissions, using an exclusive lubrication oil for the clutch enhances lubricating and cooling effect on the clutch.

In general, a big capacity of the clutch is needed to transmit a large torque when a vehicle is required to have a high level of power performance. Therefore, the clutch often produces a problem of increasing generation heat or durability and the like. On the other hand, when the clutch is provided with a conventional air cooling system or water cooling system described above as a cooling system for lubrication oil, the problems described below can be occurred.

A cooling air taken into an air cooler is low while the vehicle is running at a low speed when using an air-cooled cooling system as a cooling system for lubrication oil. Thereby, a cooling effect for lubrication oil is remarkably lowered. In addition, a vehicle body needs to be provided with a large aperture to introduce enough cooling air into the air cooler. This can affect a design of the vehicle body. Furthermore, the air cooler needs to be disposed on a front part of the vehicle to be provided with a big aperture to introduce the cooling air. Therefore, when a transmission is on the rear part of the vehicle body, a pipeline for oil needs to be arranged from the rear part up to the front part of the vehicle body. Thereby the pipeline for lubrication oil becomes long. Thus, oil resistance in the pipeline increases, and a pressure of lubrication oil needs to be raised in order to make lubrication oil circulate with a large flow rate. In addition, when the pipeline for lubrication oil becomes long, the weight of the vehicle body increases and the layout of the piping becomes complicated.

On the other hand, when using the water cooling system as a cooling system for lubrication oil, the lubrication oil and other components (for example, an engine) are cooled by the same cooling water of the cooling system. Therefore, enough cooling of lubrication oil can be prevented. Also, when the temperature of the cooling water rises, there is a risk that the water temperature cannot meet a required temperature for cooling the engine and other components. Furthermore, the flow rate of the cooling water (pump capacity) is predetermined and there is a certain temperature condition that lubrication oil can be possibly prevented from being cooled enough due to the shortage of the flow rate of the cooling water.

On the other hand, when the vehicle is provided with the air cooler as a cooling means for lubrication oil for lubricating the clutch and the gear and the likes of the transmission, the radiation heat in the air cooler becomes excessive in quantity, thereby the temperature of lubrication oil is possibly excessively lowered. This can increase friction resistance (friction) of the clutch and the gear.

SUMMARY OF THE INVENTION

The present invention is achieved to solve the above-described problems. And the purpose is to optimize the temperature of lubrication oil by effective heat exchange of lubrication oil in a heat exchanging device for exchanging heat of lubrication oil which circulates in a transmission for a vehicle.

To solve the above-described problems, a heat exchanging device of lubrication oil according to the present invention is a heat exchanging device for cooling lubrication oil which circulates in a transmission (4) of a vehicle, and further has a first lubrication oil circulating circuit (10) through which a first lubrication oil circulates to be supplied to friction engaging devices (C1, C2) of the transmission (4), a second lubrication oil circulating circuit (20) through which a second lubrication oil circulates to be supplied to mechanisms other than the friction engaging devices (C1, C2) of the transmission (4), a cooling water circulating circuit (30) through which a cooling water circulates to cool driving sources (2,3) of the vehicle, a first heat exchanger (13-1) for exchanging heat between the first lubrication oil and the second lubrication oil, and a second heat exchanger (13-2) for exchanging heat between the first lubrication oil and the cooling water.

The heat exchanging device of lubrication oil according to the present invention has the first lubrication oil circulating circuit through which the first lubrication oil circulates to be supplied to friction engaging devices of the transmission, the second lubrication oil circulating circuit through which the second lubrication oil circulates to be supplied to mechanisms other than the friction engaging devices, and the cooling water circulating circuit through which a cooling water circulates to cool driving sources of the vehicle, and further has two heat exchangers, namely, the first heat exchanger for exchanging heat between the first lubrication oil and the second lubrication oil and the second heat exchanger for exchanging heat between the first lubrication oil and the cooling water. This enables the first lubrication oil to be cooled by heat exchanging with the cooling water in one heat exchanger (the first heat exchanger) while cooled by heat exchanging with the second lubrication oil in the other heat exchanger (the second heat exchanger).

This configuration enables the heat exchanging between the second lubrication oil and the first lubrication oil to support a cooling of the first lubrication oil due to the heat exchanging between the cooling water and the first lubrication. Thus, even when the temperature of the cooling water for cooling the driving sources rises on a running condition where the loads of the driving sources of the vehicle is high, the first lubrication oil can be cooled by the second lubrication oil. Therefore, a temperature rising of the first lubrication oil can be restrained and the friction engaging device can be effectively cooled by the first lubrication oil, thereby the temperature of the friction engaging device can be prevented from excessively rising. On the other hand, when the temperature of the first lubrication oil is low, the temperature of the first lubrication oil can be effectively raised by the heat exchanging between the cooling water warmed by generation heat of the driving sources and the first lubrication oil, thereby a friction resistance (friction) of the friction engaging device can be reduced.

Furthermore, in the above-described heat exchanging device of lubrication oil, the second lubrication oil circulating circuit (20) may include an air cooler (25) for cooling the second lubrication oil by air. According to the configuration, the heat exchanging device includes the air cooler for cooling the second lubrication oil by air, and the first lubrication oil can be cooled by the second lubrication oil cooled by the air cooler even when the temperature of the cooling water for cooling the driving sources rises on a running condition where the loads of the driving sources of the vehicle is high. Therefore, the friction engaging device can be effectively cooled by the second lubrication oil, thereby the temperature rising of the friction engaging device can be prevented more effectively.

In addition, in the above-described heat exchanging device of lubrication oil, the first heat exchanger (13-1) and the second heat exchanger (13-2) may be arranged in parallel with each other in the first lubrication oil circulating circuit (10).

According to the configuration for the first and the second heat exchangers to be arranged in parallel with each other, a pressure loss of the first lubrication oil which circulates through the first lubrication oil circulating circuit can be reduced, thereby a larger flow rate of the first lubrication oil can be made flow with fixed hydraulic pressure. Therefore, the friction engaging device can be cooled more effectively by the first lubrication oil.

Furthermore, in the above-described heat exchanging device of lubrication oil, the first heat exchanger (13-1) and the second heat exchanger (13-2) are arranged in series with each other in the first lubrication oil circulating circuit (10), and the first heat exchanger (13-1) is disposed on an upstream side of the second heat exchanger (13-2).

According to the configuration for the first and the second heat exchangers to be arranged in series with each other, a high cooling effect of the first lubrication oil can be obtained. Furthermore, according to the configuration that the first heat exchanger is disposed on an upstream side of the second heat exchanger, when the temperature of the first lubrication oil needs to be raised by the cooling water at the time that the temperature of the first lubrication oil is low, the first lubrication oil warmed by heat exchanging with the cooling water in the second heat exchanger cannot be cooled back again by heat exchanging with the second lubrication oil. Thereby, the temperature of the first lubrication oil can be raised more effectively.

Furthermore, in the above-described heat exchanging device of lubrication oil, the transmission (4) includes a first input shaft (IMS) connected so as to be engaged with and disengaged from a drive shaft (2a) connected to driving sources (2, 3) of the vehicle through a first clutch (CL1), a second input shaft (OMS) connected so as to be engaged with and disengaged from the drive shaft (2a) through a second clutch (CL2), an output shaft (CS) for outputting power toward driving wheels (WR, WL), a first gear shift mechanism (G1) disposed between the first input shaft (IMS) and the output shaft (CS) and capable of setting each of odd-numbered gear ratio steps from the first gear ratio step, and a second gear shift mechanism (G2) disposed between the second input shaft (OMS) and the output shaft (CS) and capable of setting each of even-numbered gear ratio steps from the second gear ratio step. The first clutch (CL1) and the second clutch (CL2) may be the friction engaging devices cooled by the first lubrication oil which circulates through the first lubrication oil circulating circuit (10).

In the above-described vehicle on which a so-called "twin-clutch transmission" having the first and the second clutches are mounted, when a half-engaged state (so-called "half-clutch state") of the first and the second clutches continue in states where the vehicle travels for a long-time at relatively low speed and starting and stopping of the vehicle are frequently repeated, as well as a traffic jam continues for a long time, generation heat thereof increases while generation heat of mechanisms of other than the first and the second clutches (such as gears with which the first and the second gear shift mechanism are provided) decrease. In contrast, according to the above-described configuration of the present invention, the first and the second clutches are the friction engaging devices supplied with the first lubrication oil which circulates through the first lubrication oil circulating circuit and so, the first and the second clutches can be effectively cooled by the first lubrication oil. Therefore, a temperature rising of the first and the second clutches are effectively restrained.

In addition, in the above-described heat exchanging device of lubrication oil, the first lubrication oil and the second lubrication oil may be different from each other in properties. According to the configuration that mutually different kinds of lubrication oils are respectively used as the first lubrication oil for lubricating and cooling the friction engaging devices and as the second lubrication oil for lubricating and cooling the mechanisms other than the friction engaging devices, the optimal lubrication and cooling can be respectively performed in accordance with the characteristics of the friction engaging devices and each of the characteristics of the mechanisms other than the friction engaging device.

Furthermore, in the above-described heat exchanging device of lubrication oil, the first lubrication oil circulating circuit (10) may include an air cooler (16) for cooling the first lubrication oil by air. In a case where a vehicle travels at high speed, the temperature of the cooling water for cooling driving sources rises, thereby cooling effect of the cooling water oil on the first lubrication is deteriorated. In contrast, according to the above-described configuration in that the first lubrication oil circulating circuit is provided with the air cooler for cooling the first lubrication oil by air, the temperature rising of the friction engaging devices can be restrained.

In addition, the above-described heat exchanging device of lubrication oil has a first oil temperature detecting means (15) for detecting an oil temperature of the first lubrication oil guided to the first heat exchanger (13-1) from the first lubrication oil circulating circuit (10), a second oil temperature detecting means (26) for detecting an oil temperature of the second lubrication oil guided to the first heat exchanger (13-1) from the second lubrication oil circulating circuit (20), a bypass oil passage (27) disposed on the second lubrication oil circulating circuit (20) to bypass the first heat exchanger (13-1), and an open/close selector means (28b) for switching open and close of the bypass oil passage (27). When the temperature of the first lubrication oil detected by the first oil temperature detecting means (15) is lower than the temperature of the second lubrication oil detected by the second oil temperature detecting means (26), the bypass oil passage (27) may be opened by the open/close selector means (28b). On the other hand, when the temperature of the first lubrication oil detected by the first oil temperature detecting means (15) is higher than the temperature of the second lubrication oil detected by the second oil temperature detecting means (26), the bypass oil passage (27) may be closed by the open/close selector means (28b).

According to the configuration, a propriety of heat exchange between the first lubrication oil and the second lubrication oil in the first heat exchanger can be judged based on temperature differences between the first lubrication oil and the second lubrication oil. Thus, the first lubrication oil can be constantly cooled by the second lubrication oil when the heat exchange between the first lubrication oil and the second lubrication oil are conducted.

In addition, the above-described heat exchanging device of lubrication oil may be provided with the bypass oil passage (27) disposed on the second lubrication oil circulating circuit (20) to bypass the first heat exchanger (13-1), and a thermostat valve (28a) which opens the bypass oil passage when the temperature of the second lubrication oil guided to the first heat exchanger (13-1) from the second lubrication oil circulating circuit (20) is equal to or higher than a predetermined temperature.

According to the configuration, when the temperature of the second lubrication oil is equal to or higher than a predetermined value, the heat exchange between the first lubrication oil and the second lubrication oil cannot be conducted in the first heat exchanger. This enables to avoid temperature rising of the first lubrication oil due to heat exchange with the second lubrication oil. Furthermore, the above-mentioned symbols in parentheses show the symbols of components in embodiments described below as an example of the present invention.

A heat exchanging device of lubrication oil in accordance with the present invention allows the temperature to be optimized by effective heat exchanges of lubrication oil in the heat exchanging device for exchanging the heat of lubrication oil which circulates in a transmission for a vehicle.

DETAILED DESCRIPTION

Embodiments of the present invention are hereinafter described in detail referring to attached drawings.

[The First Embodiment]

Figure 1:
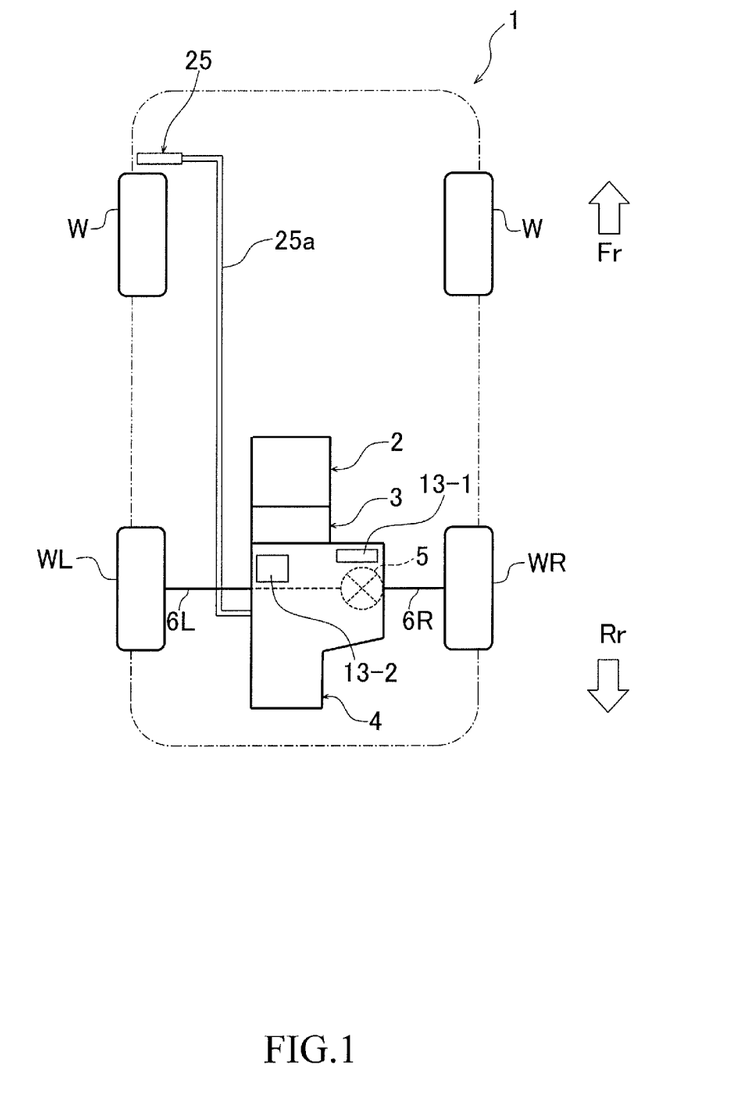
FIG. 1 shows a schematic configuration of a vehicle provided with a cooling device (a heat exchanging device) for lubrication oil in accordance with an embodiment of the present invention.
Figure 2:
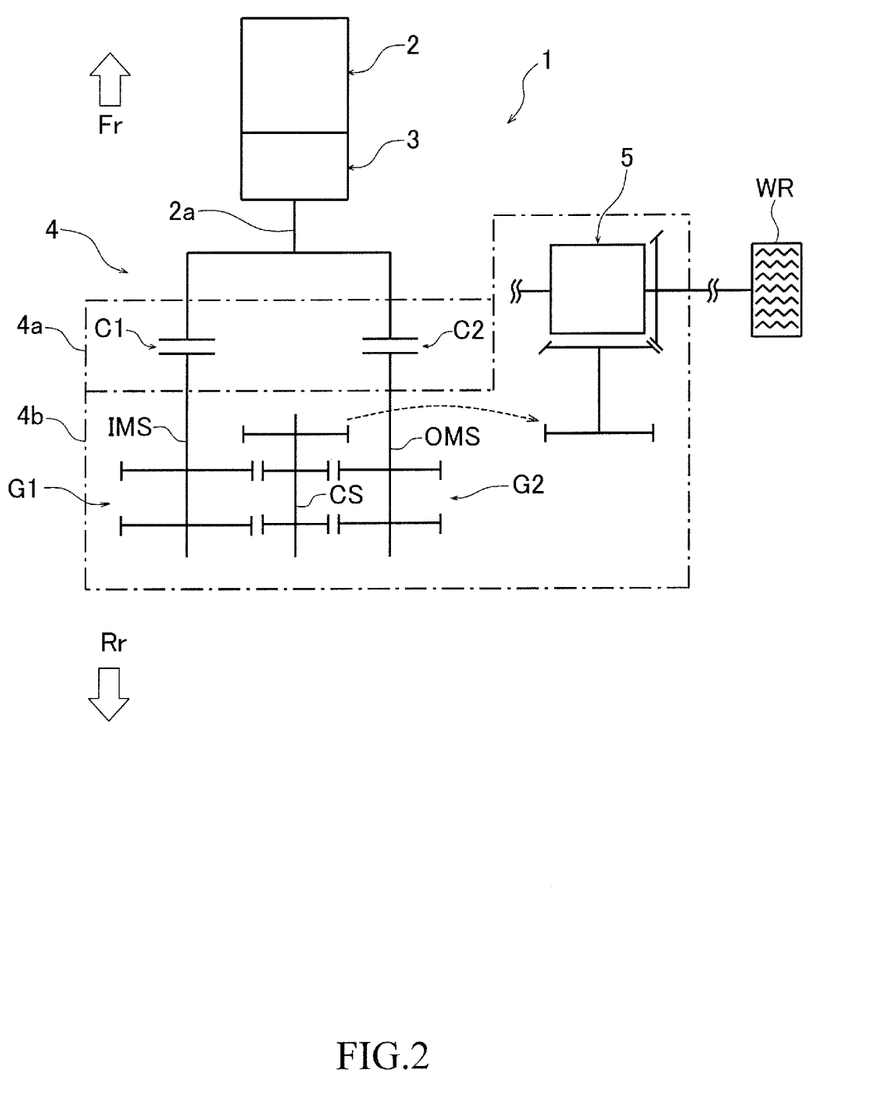
FIG. 2 is a skeleton view showing a configuration of a transmission mounted on the vehicle.

FIG. 1 shows a schematic configuration of a vehicle provided with a cooling device of lubrication oil in accordance with an embodiment of the present invention. FIG. 2 is, further, a skeleton view showing a configuration of a transmission mounted on the vehicle. A vehicle 1 shown in FIG. 1 is a vehicle as a hybrid automobile provided with an engine (an internal combustion engine) 2 and a motor (an electromotor) 3 as driving sources. The vehicle 1 includes a twin-clutch transmission 4, a differential mechanism 5, right and left side drive shafts 6R and 6L, and right and left drive wheels (rear wheels) WR and WL. Rotation driving force of the engine 2 and the motor 3 is transmitted to the right and left drive wheels WR and WL via the transmission 4, the differential mechanism 5, and the drive shafts 6R and 6L. The vehicle 1 of the present embodiment is a rear wheel drive vehicle which uses the rear wheels WR, WL as drive wheels and front wheels W, W as driven wheels. The vehicle 1 is a rear transmission type vehicle which has the transmission 4 disposed on the rear side (between the right and left rear wheels WR and WL). In addition, hereupon, shown are cases where the vehicle 1 is a rear wheel drive vehicle which uses the rear wheels WR, WL as drive wheels and front wheels W, W as driven wheels. Except for the cases, however, though showing is omitted, the vehicle 1 may be a four-wheel drive vehicle which uses rear wheels as main drive wheels and front wheels as sub drive wheels. As shown in FIG. 2, the transmission 4 includes a first input shaft IMS, a second input shaft OMS, an output shaft CS, a first gear shift mechanism G1, and a second gear shift mechanism G2. The first input shaft IMS is selectively connected to an output shaft (a driving shaft) 2a of the engine 2 and the motor 3 via a first clutch (an odd-numbered stage clutch) C1. The second input shaft OMS is selectively connected to the output shaft 2a of the engine 2 and the motor 3 via a second clutch (an even-numbered stage clutch) C2. The output shaft CS outputs power to the drive wheels WR, WL. The first gear shift mechanism G1 is disposed between the first input shaft IMS and the output shaft CS. The first gear shift mechanism G1 is capable of setting a plurality of odd-numbered gear shift stages from the lowest stage (for example, 1st, 3rd, and 5th gear ratio steps). The second gear shift mechanism G2 is capable of setting a plurality of even-numbered gear shift stages from the lowest stage (for example, 2nd, 4th, and 6th gear ratio steps).

The first clutch C1 and the second clutch C2 are lubricated and cooled by clutch oil (ATF: a first lubrication oil). Gears of the first gear shift mechanism G1, the second gear shift mechanism G2, and the differential mechanism 5 are lubricated and cooled by gear oil (hypoid gear oil: a second lubrication oil). That is, the above-described clutch oil is a lubrication oil which circulates in a clutch chamber (a clutch case) 4a on which the first clutch C1 and the second clutch C2 are disposed. The above-described gear oil is a lubrication oil which circulates in a gear chamber (a gear case) 4b in which the first gear shift mechanism G1, the second gear shift mechanism G2, and the differential mechanism 5 are housed. The clutch oil and gear oil are mutually different kinds of lubrication oil. It means that the transmission 4 of the present embodiment has a configuration (a two-liquid separation configuration) which the clutch oil and gear oil are housed in mutually separated cases. Thus, mutually different kinds of oil, used to lubricate and cool the first clutch C1 and the second clutch C2 and used to lubricate and cool the gears of the first gear shift mechanism G1, the second gear shift mechanism G2, and the differential mechanism 5, are used. This enables effective lubrication and cooling matched with the characteristics of the first and the second clutch C1 and C2 and the characteristics of gears of the first and the second gear shift mechanism G1 and G2.

Figure 3:
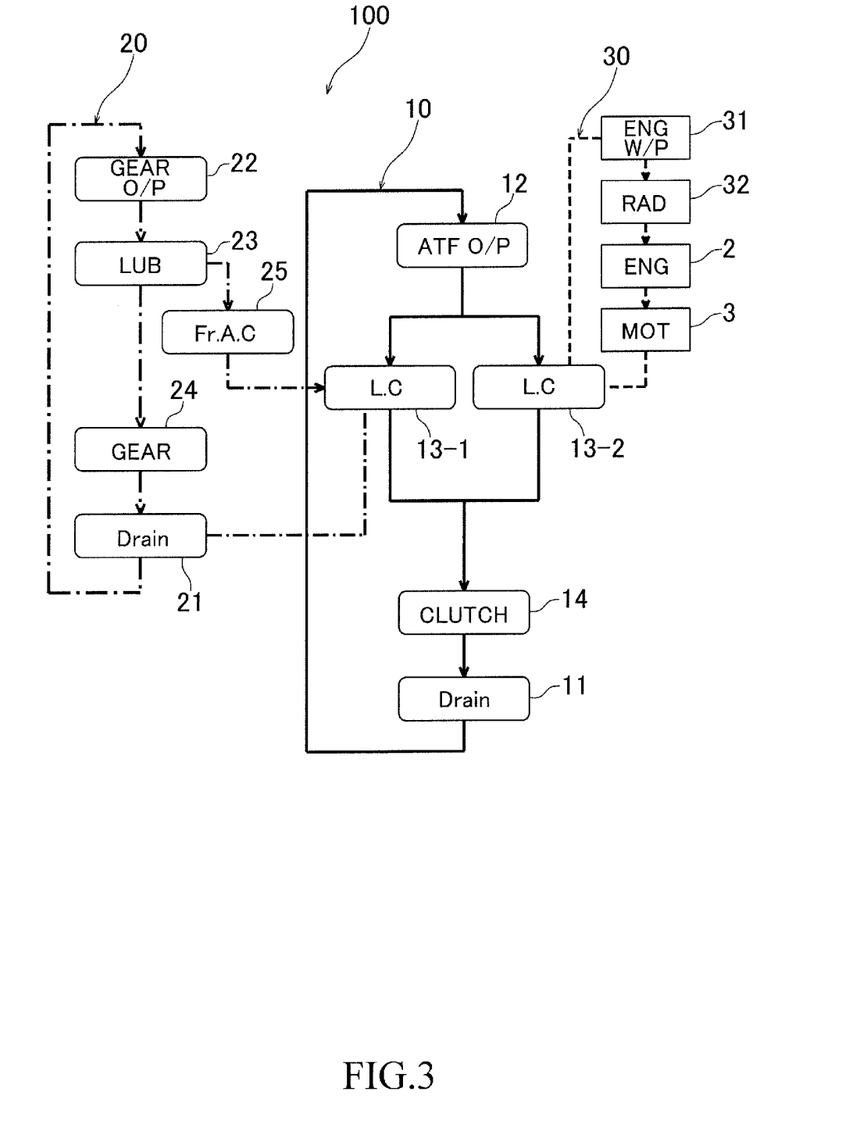
FIG. 3 is a block view showing the cooling device of lubrication oil in accordance with the first embodiment of the present invention.

FIG. 3 is a block view showing a configuration example of the cooling device (heat exchanging device) for lubrication oil in accordance with the first embodiment of the present invention. The cooling device of lubrication oil 100 shown in the figure has a first oil circulating circuit (a first lubrication oil circulating circuit) 10 through which the clutch oil circulates, a second oil circulating circuit (a second lubrication oil circulating circuit) 20 through which the gear oil circulates, and a cooling water circulating circuit 30 through which cooling water for an engine 2 circulates. The first oil circulating circuit 10 has an oil pump 12, a first heat exchanger 13-1 and a second heat exchanger 13-2 disposed on a downstream side of the oil pump 12, and a clutch (a friction engaging device) 14 disposed on a downstream side of the first heat exchanger 13-1 and the second heat exchanger 13-2. The oil pump 12 pumps up the clutch oil remaining in a drain 11 and transfers the same. The first heat exchanger 13-1 and the second heat exchanger 13-2 are arranged in parallel in the first oil circulating circuit 10. The clutch (friction engaging device) 14 are lubricated and cooled by clutch oil. The first oil circulating circuit 10 is a circuit through which clutch oil circulates via the drain 11, the oil pump 12, the first and the second heat exchanger 13-1, 13-2, and the clutch 14 in this order. The clutch 14 described here is the first clutch C1 and the second clutch C2 with which the transmission 4 shown in FIG. 2 is provided. The first heat exchanger 13-1 exchanges heat between the clutch oil of the first oil circulating circuit 10 and the gear oil of the second oil circulating circuit 20. In addition, the second heat exchanger 13-2 exchanges heat between the clutch oil of the first oil circulating circuit 10 and the cooling water of the cooling water circulating circuit 30.

The second oil circulating circuit 20 of the gear oil has an oil pump 22, a lubricated object 23 disposed on a downstream side of the oil pump 22, and gears 24 cooled by the gear oil and disposed on a downstream side of the lubricated object 23. The oil pump 22 pumps up gear oil remaining in a drain 21 and transfers the same. The second oil circulating circuit 20 is a circuit through which the gear oil circulates via the drain 21, the oil pump 22, the lubricated object 23, and the gears 24 in this order. In addition, the gear oil discharged from the lubricated object 23 is partly guided to an air cooler 25. The gear oil is cooled by the air cooler 25. Furthermore, gear oil cooled by the air cooler 25 is guided to the first heat exchanger 13-1 of the first oil circulating circuit 10. Heat exchange between the gear oil and the clutch oil which circulates through the first oil circulating circuit 10 is conducted in the first heat exchanger 13-1. The gear oil is returned to the drain 21 after finishing heat exchanging with the clutch oil in the first heat exchanger 13-1.

The cooling water circulating circuit 30 has a cooling water pump 31 making a cooling water circulate in the engine 2, a radiator 32 for cooling the cooling water, the engine 2 and the motor 3 cooled by the cooling water. The cooling water circulating circuit 30 is a circuit through which the cooling water circulates via the cooling water pump 31, the radiator 32, the engine 2, and the motor 3 in this order. In addition, the cooling water is guided to the second heat exchanger 13-2 of the first oil circulating circuit 10 after cooling the motor 3. Heat exchange between the cooling water and the clutch oil which circulates through the first oil circulating circuit 10 is conducted in the second heat exchanger 13-2. The cooling water is transferred to the radiator 32 again by the cooling water pump 31 after finishing exchanging heat with the clutch oil in the second heat exchanger 13-2.

As shown in FIG. 1, the first heat exchanger 13-1 and the second heat exchanger 13-2 with which the first oil circulating circuit 10 is provided are both disposed on the same positions as the transmission 4, such as a lateral portion and an upper portion of the transmission 4 in the vehicle 1. On the other hand, the air cooler (a front air cooler) 25 for cooling the gear oil by air, with which the second oil circulating circuit 20 is provided, is disposed on a front surface of the vehicle 1, in detail, on a front side of the left front wheel W. Also, the vehicle 1 is provided with a pipe 25a for circulating the gear oil between the gear chamber (a gear case) 4b of the transmission 4 (see FIG. 2) and the air cooler 25. The pipe 25a is a part of the second oil circulating circuit 20. Thus, the air cooler 25 is disposed on the front surface of the vehicle, thereby air can be effectively taken into the air cooler 25. Therefore, cooling of the gear oil by the air cooler 25 can be promoted.

As described above, the cooling device of lubrication oil 100 of the present embodiment is a cooling device having the first oil circulating circuit 10 through which the clutch oil circulates to lubricate the first and the second clutch C1 and C2 with which the transmission 4 is provided, the second oil circulating circuit 20 through which the gear oil circulates to lubricate mechanisms other than the first and the second clutch C1 and C2 with which the transmission 4 is provided, and the cooling water circulating circuit 30 through which the cooling water circulates to cool the engine 2 and the motor 3 which are driving sources of the vehicle. Thus, the cooling device of lubrication oil 100 is provided with two heat exchangers: the first heat exchanger 13-1 for exchanging heat between the clutch oil and the gear oil and the second heat exchanger 13-2 for exchanging heat between the clutch oil and the cooling water. This enables to the cool clutch oil by heat exchanging with the cooling water for the engine 2 in the second heat exchanger 13-2, while cooling the clutch oil by heat exchanging with the gear oil in the first heat exchanger 13-1.

According to the configuration, heat exchange between the gear oil and the clutch oil is configured to be conducted in the first heat exchanger 13-1, thereby cooling of the gear oil by the cooling water of the engine 2 conducted in the second heat exchanger 13-2 can be assisted. That is, on a running condition where loads of the engine 2 and the motor 3 which are driving sources of the vehicle are heavy, even when the temperature of the cooling water for cooling the engine 2 and the motor 3 rises, the clutch oil can be cooled by the gear oil. Therefore, a temperature rising of the clutch oil can be restrained and the first and the second clutch C1 and C2 can be effectively cooled by the clutch oil. Thereby, an excessive temperature rising of the first and the second clutch C1 and C2 can be prevented. Meanwhile, when the temperature of the clutch oil is low, the temperature of the clutch oil can be effectively raised by heat exchanging between the cooling water warmed by heat generation of the engine 2 and the motor 3 and the clutch oil. Thereby the friction resistance (friction) of the first and the second clutch C1 and C2 can be reduced.

In addition, the vehicle 1 is provided with the air cooler 25 for the cooling gear oil by air, thereby the clutch oil can be cooled by the gear oil cooled by the air cooler 25 even when the temperature of the cooling water for cooling the engine 2 and the motor 3 rises, on a running condition where loads of the engine 2 and the motor 3 which are driving sources of the vehicle 1 are heavy. Therefore, a temperature rising of the first and the second clutch C1 and C2 can be effectively prevented due to cooling of the clutch oil.

In addition, in the cooling device 100 of the present embodiment, the first heat exchanger 13-1 and the second heat exchanger 13-2 are arranged in parallel with each other, thereby a pressure loss of the clutch oil which circulates through the first oil circulating circuit 10 can be reduced, and a larger flow amount of the clutch oil can be flowed with fixed oil pressure. Therefore, the first and the second clutch C1 and C2 can be effectively cooled by the clutch oil.

Furthermore, in the vehicle on which the so-called twin-clutch transmission 4 having the first and the second clutch C1 and C2 is mounted as described in the present embodiment, a generation heat increases when a half-engaged state (so-called half-clutch state) of the first and the second clutches C1 and C2 continues on running conditions where the vehicle is traveling at relatively low speed for a long time and starting and stopping are frequently repeated, for example, where traffic congestion lasts for a long time. On the other hand, the generation heat decreases in mechanisms other than the first and the second clutches C1 and C2 (such as gears with which the first and the second gear shift mechanisms G1 and G2 are provided). Whereas, in the cooling device 100 of the present embodiment, the first and the second clutches C1 and C2 are cooled by the clutch oil which circulates through the first oil circulating circuit 10, thereby the first and the second clutches C1 and C2 can be effectively cooled by the clutch oil. This enables to effectively restrain temperature rising of the first and the second clutches C1 and C2.

In order to effectively cool the clutch oil and further to fully cool the clutch oil by heat exchange between the gear oil and the clutch oil in the first heat exchanger 13-1, the cooling device of lubrication oil 100 according to the present embodiment is preferably configured to meet such a following condition that a temperature T02 of the gear oil introduced into the first heat exchanger 13-1 is lower than a temperature T01 of the clutch oil introduced into the first heat exchanger 13-1 (T02<T01), or the temperature T02 of the gear oil introduced into the first heat exchanger 13-1 is lower than a given temperature (TA) (T02<TA), for example.

[The Second Embodiment]

Next, the second embodiment of the present invention is described. In descriptions about the second embodiment and the corresponding drawings, same references are given to the components which are the same as or corresponding to the first embodiment, and the detailed descriptions of the same components are omitted below. In addition, the same matters as the first embodiment are not described below. This applies to the other embodiments.

Figure 4:
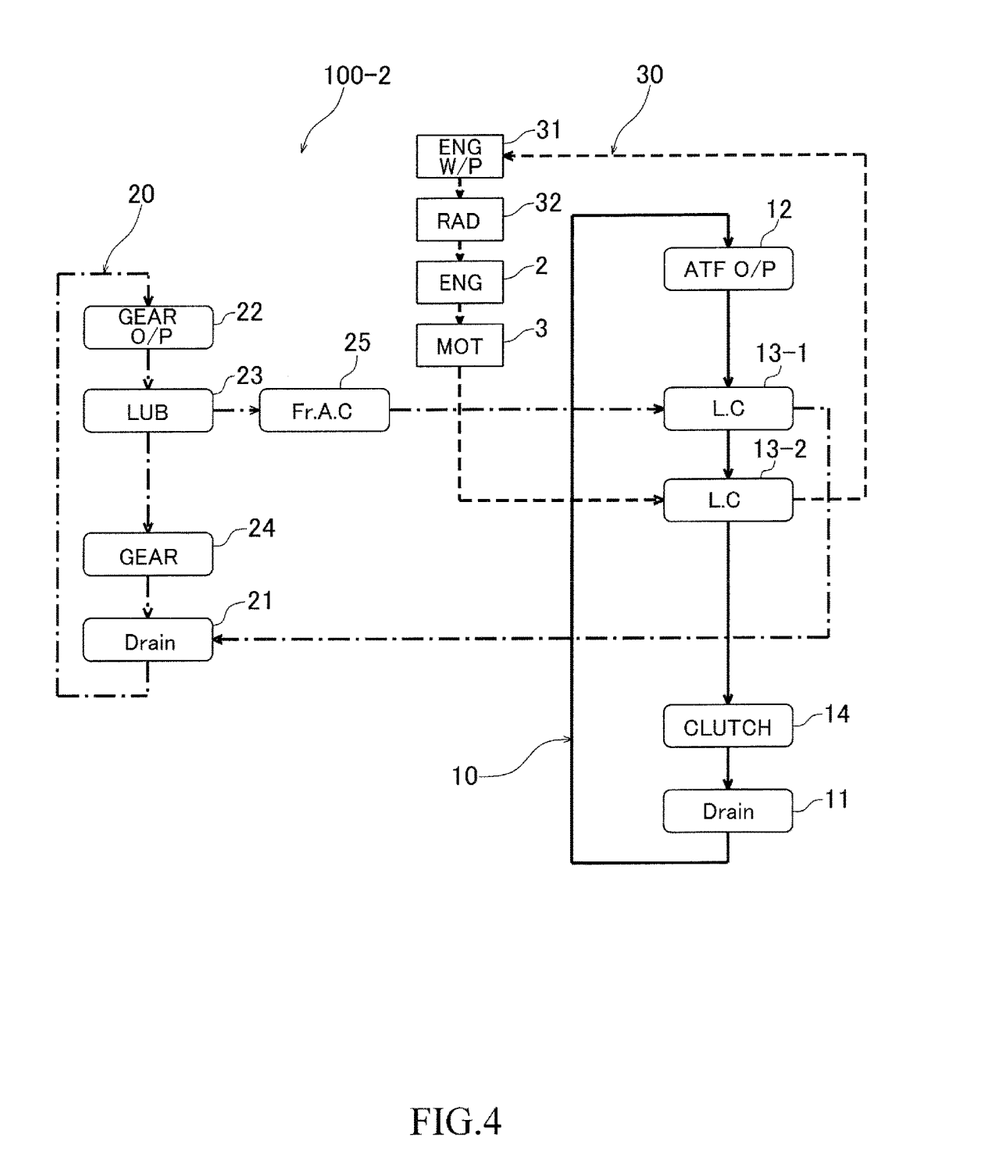
FIG. 4 is a block view showing the cooling device of lubrication oil in accordance with the second embodiment of the present invention.

FIG. 4 is a block view showing a configuration example of a cooling device of lubrication oil 100-2 in accordance with the second embodiment of the present invention. In the cooling device 100 of the first embodiment, the heat exchanger 13-1 and the second heat exchanger 13-2 with which the first oil circulating circuit 10 is provided are arranged in parallel with each other, whereas the first heat exchanger 13-1 and the second heat exchanger 13-2 are arranged in series with each other in the cooling device 100-2 of the present embodiment. Hereupon, the heat exchanger 13-1 is disposed on an upstream side, and the second heat exchanger is disposed on a downstream side.

In the cooling device 100-2 of the present embodiment, the first heat exchanger 13-1 and the second heat exchanger 13-2 are arranged in series with each other, thereby higher cooling effect can be obtained as cooling effect for the clutch oil which circulates through the first oil circulating circuit 10. In addition, the second heat exchanger 13-2 is disposed on a downstream side of the first heat exchanger 13-1, whereby there is no risk that the clutch oil warmed by heat exchanging with the cooling water of the engine 2 in the second heat exchanger 13-2 is cooled again by heat exchanging with the gear oil in the first heat exchanger 13-1 when the temperature of the clutch oil needs to be raised by generation heat of the engine 2 at the time that the temperature of the clutch oil is low. Therefore, the temperature of clutch oil can be effectively raised.

[The Third Embodiment]

Figure 5:
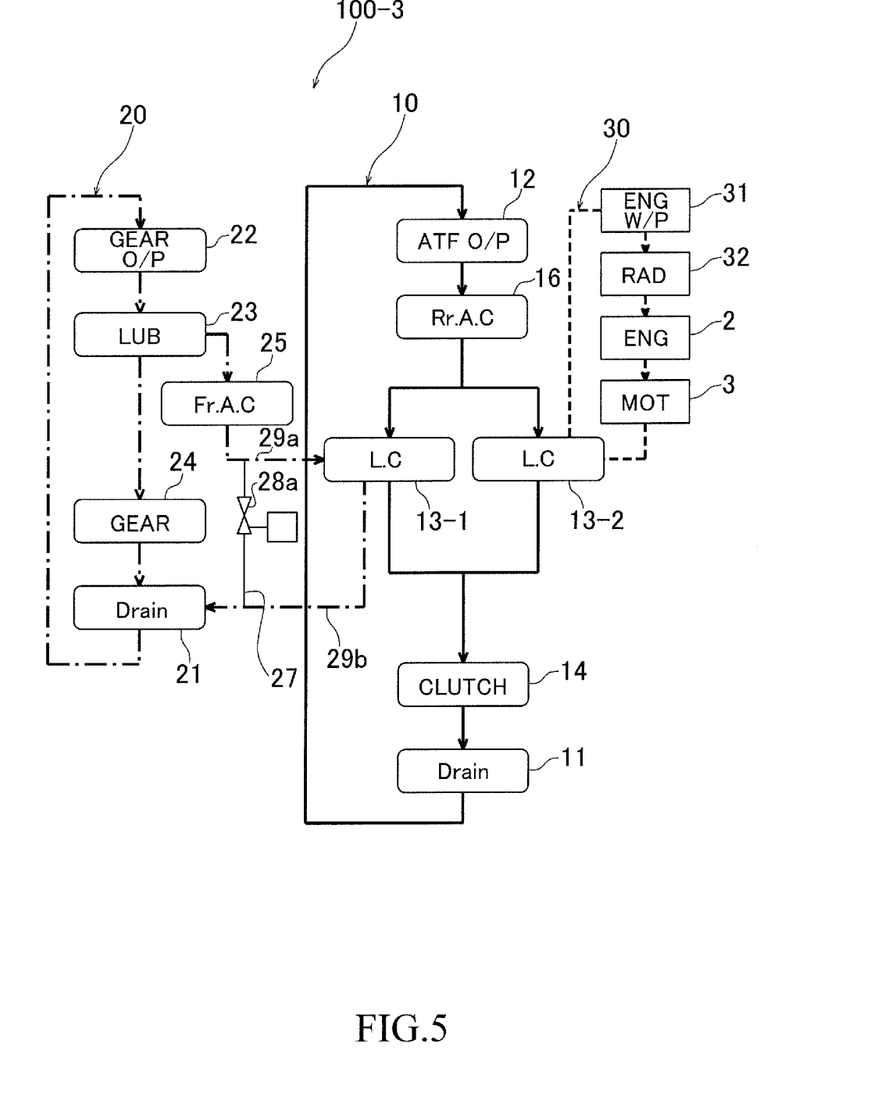
FIG. 5 is a block view showing the cooling device of lubrication oil in accordance with the third embodiment of the present invention.

The third embodiment of the present invention is described below. FIG. 5 is a block view showing a configuration example of a cooling device of lubrication oil in accordance with the third embodiment of the present invention. The cooling device 100-3 of the present embodiment has a bypass oil passage 27 which bypasses the heat exchanger 13-1 provided to the second oil circulating circuit 20, and a thermostat valve 28a provided to the bypass oil passage 27, in addition to the configuration of the cooling device 100 of the first embodiment. The bypass oil passage 27 communicates an oil passage 29a connected to the first heat exchanger 13-1 from the air cooler 25 of the second oil circulating circuit 20 with an oil passage 29b connected to the drain 21 from the first heat exchanger 13-1. The thermostat valve 28a opens the bypass oil passage 27 when the temperature of the gear oil accumulating in the bypass oil passage 27 is equal to or higher than a given temperature.

When the temperature of the gear oil which accumulates in the bypass oil passage 27 is equal to or higher than the above-described given temperature, the thermostat valve 28a is opened. Thereby, the gear oil discharged from the air cooler 25 is guided to the bypass oil passage 27, not introduced into the first heat exchanger 13-1. This prevents heat exchange between the gear oil and the clutch oil from being conducted in the first heat exchanger 13-1. On the other hand, the thermostat valve 28a is closed when the temperature of the gear oil which circulates through the bypass oil passage 27 is lower than the above-described given temperature. Thereby, the gear oil discharged from the air cooler 25 is introduced into the first heat exchanger 13-1. This enables the heat exchange between the gear oil and the clutch oil to be conducted in the first heat exchanger 13-1.

According to the cooling device 100-3 of the present embodiment, when the temperature of gear oil is equal to or higher than a given temperature, heat exchange with clutch oil by the first heat exchanger 13-1 is prohibited by circulating gear oil through the bypass oil passage 27. This enables to avoid the temperature of clutch oil from rising due to the heat exchange with the gear oil.

In addition, the cooling device 100-3 of the present embodiment has an air cooler 16 installed on a downstream side of the oil pump 12 in the first oil circulating circuit 10 and on an upstream side of the first and the second heat exchangers 13-1 and 13-2, in addition to the configuration of the cooling device 100 of the first embodiment. The clutch oil which circulates through the first oil circulating circuit 10 is cooled by the air cooler 16.

When the vehicle 1 travels at high speed, the temperature of cooling water for cooling the engine 2 and the motor 3 becomes high. Thereby, cooling effect of the cooling water for the clutch oil is lowered. Whereas, by means of the above-described configuration, the first oil circulating circuit 10 has the air cooler 16 for cooling the clutch oil by air, thereby the clutch oil can be effectively cooled even when the vehicle 1 travels at high speed. Therefore, a temperature rising of the first and the second clutches C1 and C2 can be restrained.

Figure 6:
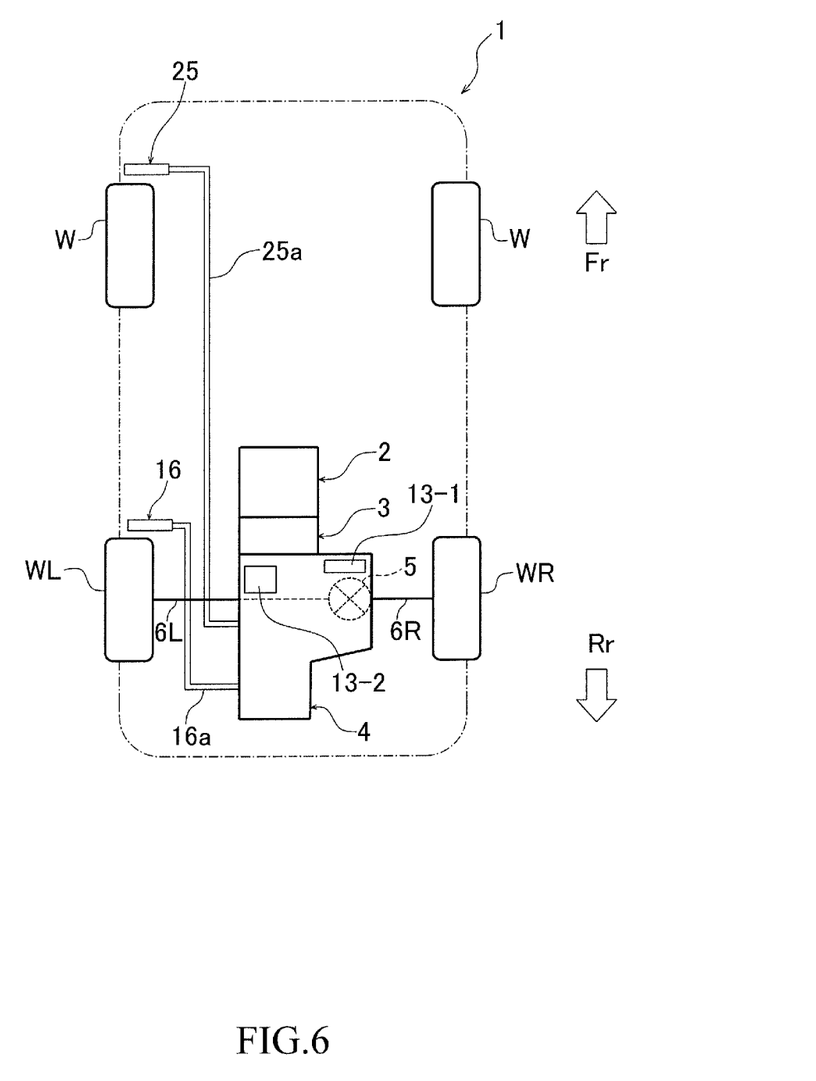
FIG. 6 shows a schematic configuration of a vehicle provided with the cooling device of the third embodiment.

FIG. 6 is a schematic view showing an overall configuration example of the vehicle of the present embodiment. As shown in the figure, the air cooler (a rear air cooler) 16 with which the first oil circulating circuit 10 is provided for cooling the clutch oil-is disposed on a position more rearward than a center in longitudinal direction of the vehicle 1, in detail, disposed on a front side of the left rear wheel WL. Also, the vehicle 1 is provided with a pipe 16a for circulating the clutch oil between the clutch chamber (the clutch case) 4a of the transmission 4 (see FIG. 2) and the air cooler 16. The pipe 16a is a part of the first oil circulating circuit 10. Thus, the air cooler 16 is disposed on a front side position of the left rear wheel WL in the vehicle 1, and air can be efficiently taken into the air cooler 16. Thereby, cooling of the clutch oil by the air cooler 16 can be promoted.

As described above, the cooling device of lubrication oil in the present embodiment has the thermostat valve 28a configured to open the bypass oil passage 27 when the temperature of gear oil which accumulates in the bypass oil passage 27 is equal to or higher than a given temperature. But the invention is not limited to only the present embodiment, though not shown, the thermostat valve 28a may be configured to have an open/close valve for switching open and close of the bypass oil passage 27 and to switch open and close of the valve in accordance with the temperature difference between the clutch oil and the gear oil which flow into the first heat exchanger 13-1.

[The Fourth Embodiment]

Figure 7:
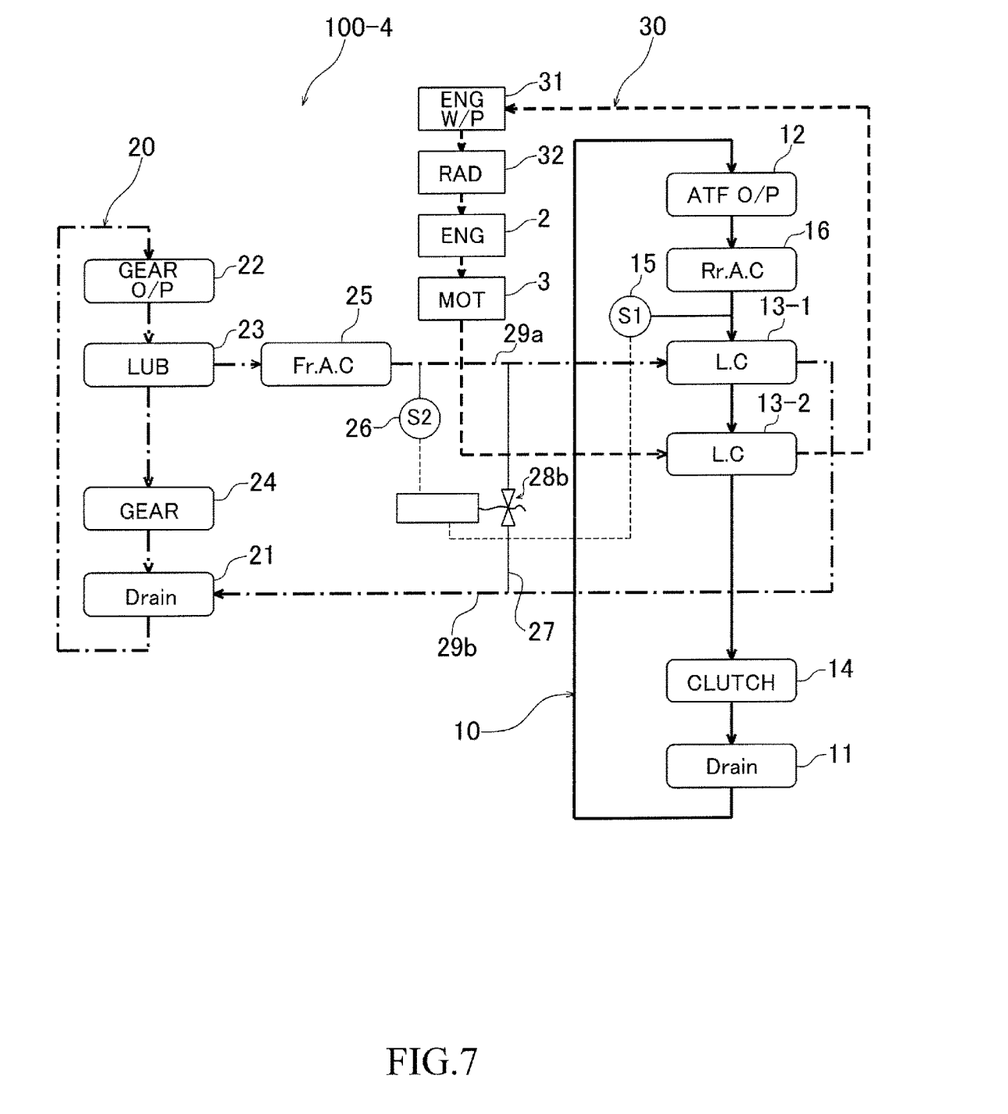
FIG. 7 is a block view showing the cooling device of lubrication oil in accordance with the fourth embodiment of the present invention.

The fourth embodiment of the present invention is described hereinafter. FIG. 7 is a block view showing a configuration example of a cooling device of lubrication oil 100-4 in accordance with the fourth embodiment of the present invention. The cooling device 100-4 of the present embodiment has the bypass oil passage 27 which bypasses the first heat exchanger 13-1 provided to the first oil circulating circuit 10, and an open/close valve (open/close selector means) 28b for switching open and close of the bypass oil passage 27, in addition to the configuration of the cooling device 100-2 of the second embodiment. In addition, a first oil temperature sensor (a first oil temperature detecting means) 15 is installed in an oil passage connected to the first heat exchanger 13-1 from the oil pump 12 in the first oil circulating circuit 10. The first oil temperature sensor 15 detects the temperature of the clutch oil which circulates through the oil passage. A second oil temperature sensor (a second oil temperature detecting means) 26 is further installed in an oil passage connected to the first heat exchanger 13-1 from the air cooler 25 in the second oil circulating circuit 20. The second oil temperature sensor 26 detects the temperature of the gear oil which circulates through the oil passage.

The oil passage 29a is connected to the first heat exchanger 13-1 from the air cooler 25 of the second oil circulating circuit 20. The bypass oil passage 27 communicates the oil passage 29a with the oil passage 29b. The open/close valve 28b switches open and close of the bypass oil passage 27, based on the temperature of clutch oil detected by the first oil temperature sensor 15 and the temperature of gear oil detected by the second oil temperature sensor 26.

Also, when the temperature of clutch oil detected by the first oil temperature sensor 15 is lower than the temperature of gear oil detected by the second oil temperature sensor 26, the open/close valve 28b is opened. This enables to guide the gear oil discharged from the air cooler 25 to the bypass oil passage 27 and prevents the gear oil from being introduced into the first heat exchanger 13-1. This prevents heat exchange between the gear oil and the clutch oil from being conducted in the first heat exchanger 13-1. Contrary, when the temperature of clutch oil detected by the first oil temperature sensor 15 is higher than the temperature of gear oil detected by the second oil temperature sensor 26, the open/close valve 28b is closed. Thereby, the gear oil discharged from the air cooler 25 is introduced into the first heat exchanger 13-1. This enables the heat exchange between the gear oil and the clutch oil to be conducted in the first heat exchanger 13-1.

According to the cooling device 100-4 of the present embodiment, a propriety of heat exchange by the first heat exchanger 13-1 is judged based on a temperature difference between the temperature of gear oil and the temperature of clutch oil introduced into the first heat exchanger 13-1. Thereby, the clutch oil can be constantly and securely cooled by the heat exchange between the clutch oil the and gear oil.

In addition, the cooling device 100-4 of the present embodiment has the air cooler 16 installed on a downstream side of the oil pump 12 in the first oil circulating circuit 10 and on an upstream side of the first and the second heat exchangers 13-1 and 13-2, in addition to the configuration of the cooling device 100 of the first embodiment. The clutch oil which circulates through the first oil circulating circuit 10 is cooled by the air cooler 16. An installation position of the air cooler 16 in the vehicle 1 of the present embodiment is, further, the same as the installation position of the air cooler 16 of the third embodiment shown in FIG. 6.

As described above, the cooling device of lubrication oil in the present embodiment has the open/close valve 28b for switching open and close of the bypass oil passage 27 and is configured to switch open and close of the open/close valve 28b in accordance with a temperature difference between oil temperature detected by the first oil temperature sensor 15 and oil temperature detected by the second oil temperature sensor 26. But the invention is not limited to only the present embodiment, though not shown, a thermostat valve may be installed in the bypass oil passage 27 instead of the above-described open/close valve 28b. The thermostat valve is configured to open the bypass oil passage 27 when the temperature of gear oil guided to the first heat exchanger 13-1 from the first oil circulating circuit 10 is equal to or higher than a given temperature.

[The Fifth Embodiment]

Figure 8:
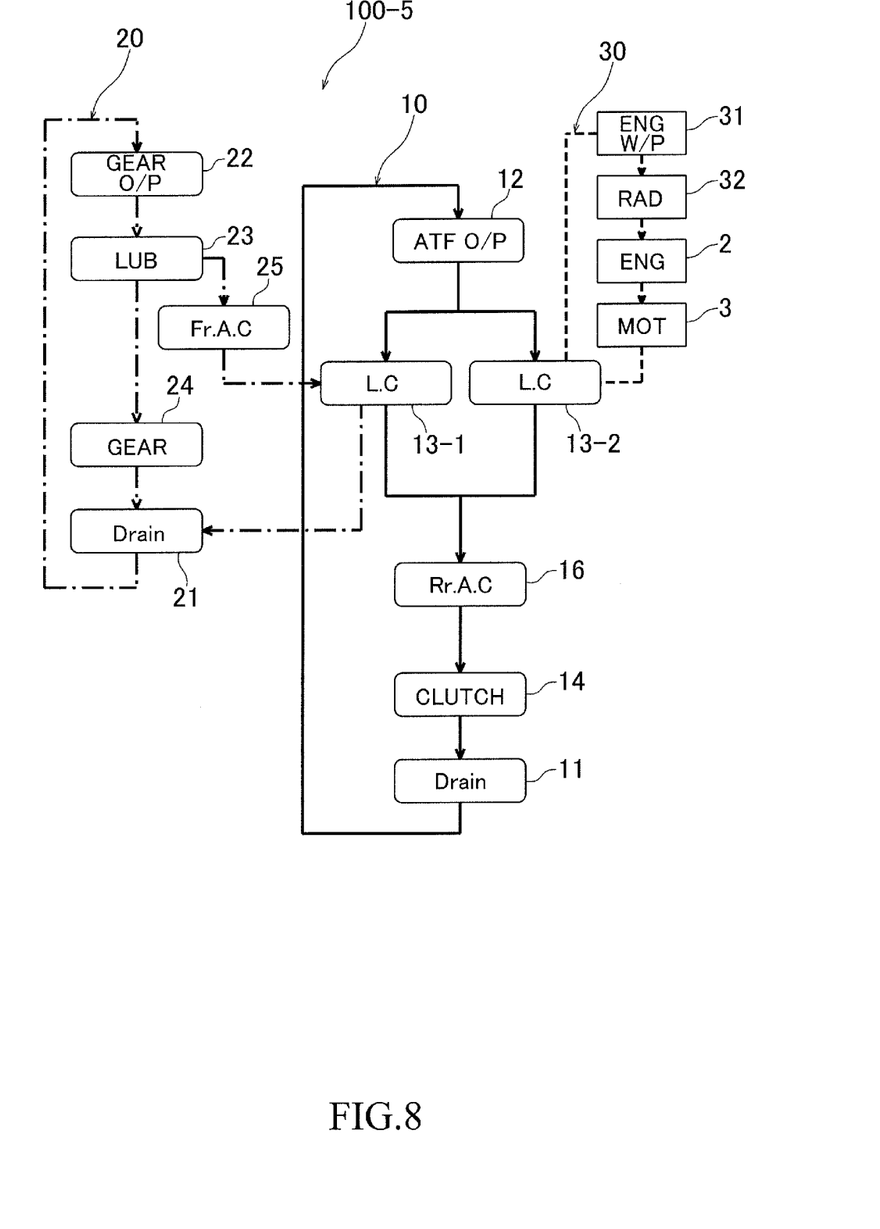
FIG. 8 is a block view showing the cooling device of lubrication oil in accordance with the fifth embodiment of the present invention.

The fifth embodiment of the present invention is described below. FIG. 8 is a block view showing a configuration example of a cooling device of lubrication oil 100-5 in accordance with the fifth embodiment of the present invention. Meanwhile, the cooling device 100-3 of the third embodiment has the air cooler 16 installed on a downstream side of the oil pump 12 and on an upstream side of the first and the second heat exchangers 13-1 and 13-2, in the first oil circulating circuit 10. Whereas, the cooling device 100-5 of the present embodiment has the air cooler 16 installed on a downstream side of the first and the second heat exchangers 13-1 and 13-2 and on an upstream side of the clutch 14 as a cooled object in the first oil circulating circuit 10. The clutch oil which circulates through the first oil circulating circuit 10 is cooled by the air cooler 16. That is, in the cooling device 100-5 of the present embodiment, the air cooler 16 is installed on a different position in the first oil circulating circuit 10, as in comparison with the cooling device 100-3 of the third embodiment. (That is, the installing order in a flow direction of clutch oil is different.) But, the installation position of the air cooler 16 in the vehicle 1 of the present embodiment is the same as the installation position of the air cooler 16 of the third embodiment shown in FIG. 6.

[The Sixth Embodiment]

Figure 9:
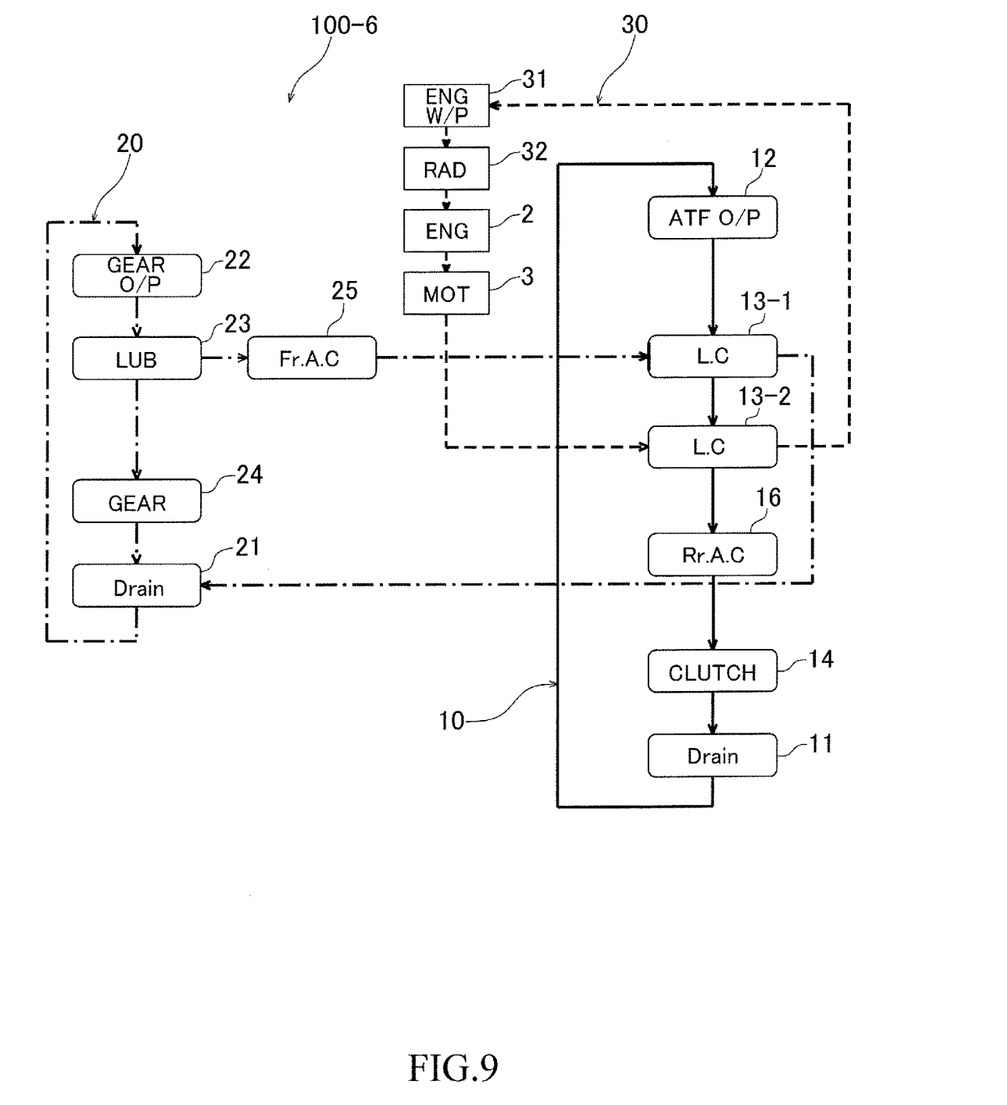
FIG. 9 is a block view showing the cooling device of lubrication oil in accordance with the sixth embodiment of the present invention.

The sixth embodiment of the present invention is described below. FIG. 9 is a block view showing a configuration example of a cooling device of lubrication oil 100-6 in accordance with the sixth embodiment of the present invention. Meanwhile, the cooling device 100-4 of the fourth embodiment has the air cooler 16 installed on a downstream side of the oil pump 12 and on an upstream side of the first heat exchanger 13-1 in the first oil circulating circuit 10. The cooling device 100-6 of the present embodiment has the air cooler 16 installed on a downstream side of the second heat exchanger 13-2 and on an upstream side of the clutch 14 as a cooled object in the first oil circulating circuit 10. The clutch oil which circulates through the first oil circulating circuit 10 is cooled by the air cooler 16. That is, in the cooling device 100-6 of the present embodiment, the air cooler 16 is installed on a different position in the first oil circulating circuit 10, as in comparison with the cooling device 100-4 of the fourth embodiment. (That is, the installing order in a flow direction of clutch oil is different.) But, the installation position of the air cooler 16 in the vehicle 1 of the present embodiment is the same as the installation position of the air cooler 16 of the third embodiment shown in FIG. 6.

Though the embodiments of the present invention ware described above, the present invention is not limited to the above-described embodiments, and various deformations can be achieved within a scope of the technical ideas described in Claims, Specification, and Drawings.

What is claimed is:

1. A heat exchanging device of lubrication oil for exchanging heat of the lubrication oil which circulates in a transmission for a vehicle, comprising:
    a first lubrication oil circulating circuit through which a first lubrication oil circulates to be supplied to a friction engaging device of the transmission;
    a second lubrication oil circulating circuit through which a second lubrication oil circulates to be supplied to mechanisms other than the friction engaging device of the transmission;
    a cooling water circulating circuit through which a cooling water circulates to cool a driving source of the vehicle;
    a first heat exchanger for exchanging heat between the first lubrication oil and the second lubrication oil; and
    a second heat exchanger for exchanging heat between the first lubrication oil and the cooling water.

2. The heat exchanging device of lubrication oil according to claim 1, wherein the second lubrication oil circulating circuit is provided with an air cooler for cooling the second lubrication oil by air.

3. The heat exchanging device of lubrication oil according to claim 1, wherein the first heat exchanger and the second heat exchanger are arranged in parallel with each other in the first lubrication oil circulating circuit.

4. The heat exchanging device of lubrication oil according to claim 1, wherein
    the first heat exchanger is arranged in series with the second heat exchanger and disposed on an upstream side of the second heat exchanger.

5. The heat exchanging device of lubrication oil according to claim 1, wherein the transmission comprises:
    a first input shaft connected so as to be engaged with and disengaged from a drive shaft connected to the driving source of the vehicle via a first clutch;
    a second input shaft connected so as to be engaged with and disengaged from the drive shaft via a second clutch;
    an output shaft for outputting power toward drive wheels;
    a first gear shift mechanism disposed between the first input shaft and the output shaft, and capable of setting each of odd-numbered gear ratio steps from a first gear ratio; and
    a second gear shift mechanism disposed between the second input shaft and the output shaft, and capable of setting each of even-numbered gear ratio steps from a second gear ratio,
    wherein the friction engaging device is at least one of the first clutch and the second clutch to which the first lubrication oil is supplied which circulates through the first lubrication oil circulating circuit.

6. The heat exchanging device of lubrication oil according to claim 1, wherein the first lubrication oil and the second lubrication oil are mutually different kinds of lubrication oil.

7. The heat exchanging device of lubrication oil according to claim 1, wherein the first lubrication oil circulating circuit is provided with the air cooler for cooling the first lubrication oil by air.

8. The heat exchanging device of lubrication oil according to claim 1, comprising:
    a first oil temperature detecting means for detecting an oil temperature of the first lubrication oil guided to the first heat exchanger from the first lubrication oil circulating circuit;
    a second oil temperature detecting means for detecting an oil temperature of the second lubrication oil guided to the first heat exchanger from the second lubrication oil circulating circuit;
    a bypass oil passage disposed on the second lubrication oil circulating circuit to bypass the first heat exchanger; and
    an open/close selector means for switching open and close of the bypass oil passage; wherein
    the bypass oil passage is opened by the open/close selector means when the temperature of the first lubrication oil detected by the first oil temperature detecting means is lower than the temperature of the second lubrication oil detected by the second oil temperature detecting means; and
    the bypass oil passage is closed by the open/close selector means when the temperature of the first lubrication oil detected by the first oil temperature detecting means is higher than the temperature of the second lubrication oil detected by the second oil temperature detecting means.

9. The heat exchanging device of lubrication oil according to claim 1, comprising:
    the bypass oil passage disposed on the second lubrication oil circulating circuit to bypass the first heat exchanger; and
    a thermostat valve which opens the bypass oil passage when the temperature of the second lubrication oil guided to the first heat exchanger from the second lubrication oil circulating circuit is equal to or higher than a given temperature.

10. The heat exchanging device of lubrication oil according to claim 2, wherein the first heat exchanger and the second heat exchanger are arranged in parallel with each other in the first lubrication oil circulating circuit.

11. The heat exchanging device of lubrication oil according to claim 2, wherein the first heat exchanger is arranged in series with the second heat exchanger and disposed on an upstream side of the second heat exchanger.

* * * * *